United States Patent
Kaushik et al.

(10) Patent No.: US 9,373,974 B2
(45) Date of Patent: Jun. 21, 2016

(54) APPARATUS FOR INDUCTIVE CHARGING OF PORTABLE DEVICES IN VEHICLES

(71) Applicant: GM GLOBAL TECHNOLOGY OPERATIONS LLC, Detroit, MI (US)

(72) Inventors: Shailendra Kaushik, Beverly Hills, MI (US); Taeyoung Han, Bloomfield Hills, MI (US); Dan Lascu, Northville, MI (US); Jerome M. Stolicki, Sterling Heights, MI (US); Xianxi Jin, Sterling Heights, MI (US); Bahram Khalighi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 13/965,454

(22) Filed: Aug. 13, 2013

(65) Prior Publication Data

US 2014/0077758 A1  Mar. 20, 2014

Related U.S. Application Data

(60) Provisional application No. 61/703,358, filed on Sep. 20, 2012.

(51) Int. Cl.
 *H02J 7/02* (2016.01)
 *H02J 5/00* (2016.01)

(52) U.S. Cl.
 CPC ........ *H02J 7/025* (2013.01); *H02J 5/005* (2013.01)

(58) Field of Classification Search
 CPC .......................................................... H02J 7/025
 USPC .................................................................. 320/108
 See application file for complete search history.

(56) References Cited

U.S. PATENT DOCUMENTS

| 8,115,449 | B2 | 2/2012 | Jung | |
| 8,169,185 | B2* | 5/2012 | Partovi et al. | 320/108 |
| 2009/0284230 | A1* | 11/2009 | Goma | H01M 10/46 320/152 |
| 2010/0225281 | A1* | 9/2010 | Sato | 320/152 |
| 2010/0264871 | A1 | 10/2010 | Matouka | |
| 2011/0230240 | A1* | 9/2011 | Bang | H02J 7/0044 455/573 |
| 2012/0086394 | A1 | 4/2012 | Hui | |

FOREIGN PATENT DOCUMENTS

CN   2653704 Y   11/2004
KR   0792309 B1   8/2007

* cited by examiner

*Primary Examiner* — Thuan Do

(57) ABSTRACT

A portable device recharging system includes a base unit generating an electromagnetic field. A portable device includes a rechargeable battery inductively charged by the electromagnetic field. Spacers are disposed between the portable device and the base unit. The spacers support the portable device and maintain an air gap between the base unit and the portable device.

19 Claims, 3 Drawing Sheets

APPARATUS FOR INDUCTIVE CHARGING OF PORTABLE DEVICES IN VEHICLES

CROSS-REFERENCE TO RELATED APPLICATIONS

This application claims priority of U.S. Provisional Application Ser. No. 61/703,358 filed Sep. 20, 2012, the disclosure of which is incorporated by reference.

BACKGROUND OF INVENTION

An embodiment relates generally to rechargeable battery systems in a vehicle.

Electronic portable devices such as cell phones are powered by battery packs that require recharging. While it is known that such portable devices utilize contact terminals for transferring electrical energy between an external power source (e.g., power outlet) and the electronic portable device, contactless charging uses inductive charging to recharge portable devices without the electrically coupling contact terminals to transfer the electrical energy to the electrical portable device. Examples of such portable devices include cordless telephones, electronic toothbrushes, and other electronic convenience devices. An inductive charging system typically includes a base charging unit that includes an inductive coil for generating an electromagnetic field. An electrical charge is induced in an inductive coil in the electrical portable device by the inductive coil of the base charging unit. The induced electrical charge is converted to a DC voltage for recharging the battery.

Electrical devices such as cell phones have a self-protection mode where the device enters a safe charging mode if the temperature of the cell phone becomes greater than a predetermined temperature. The safe charging mode involves allowing only a trickle charge of electrical energy charge the battery. This prevents damage to the battery as well as the electronic components with the cell phone. Typically ambient temperature of an environment, such as a room of a house or building, will not cause the cell phone to enter a safe charging mode; however, charging environments such as vehicle have higher ambient temperatures, particularly if the vehicle is exposed to the sun. In such an environment, the cabin temperature can vary from 70° C. to −20° C. This condition along with the heat generation of the primary base station may cause the cell phone battery temperature to increase above the predetermined temperature threshold and enter the safe charging mode. The inability of the cell phone to charge at the expected rate is a nuisance to the user and inconvenience to the user.

SUMMARY OF INVENTION

An advantage of the embodiments described herein is the enhanced charging of a rechargeable battery for a portable device where inductive charging is used to charge the battery. Spacers are disposed between a powermat surface which includes the base charging unit and the portable device. The spacers, in addition to supporting the portable device, maintains a respective space between the base charging unit and the portable device which allows for air flow along the recharging surface of the portable device. The air flow assists in maintaining a temperature of the battery below a threshold temperature, which if exceeded, will cause the phone to enter a safe charging mode and only a trickle charge is then applied to the rechargeable battery thereby avoiding damage to the rechargeable battery. As a result, recharging time for the portable device battery is reduced.

An embodiment contemplates a portable device recharging system. The portable device recharging system includes a base unit generating an electromagnetic field. A portable device includes a rechargeable battery inductively charged by the electromagnetic field. Spacers are disposed between the portable device and the base unit. The spacers support the portable device and maintain an air gap between the base unit and the portable device

DETAILED DESCRIPTION

Figure 1:
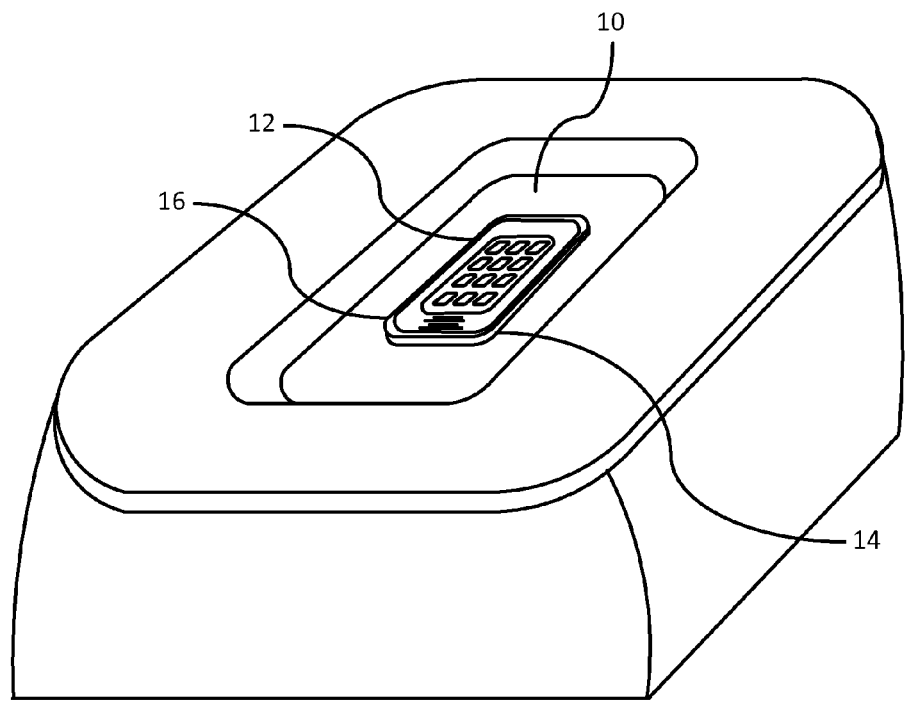
FIG. 1 is a diagrammatic view of a base charging system.

FIG. 1 illustrates a base charging unit 10 for inductively recharging a portable device 12 such as a cellular phone which is a communication device that is carried by a user for both transmitting and receiving wireless communication signals. It should be understood that the portable device can be any device that utilizes a rechargeable battery and can be recharged utilizing an inductive charging technique. The portable device 12 includes a rechargeable battery 14 that powers the portable device 12.

The rechargeable battery 14 is encased in a housing 16 for concealment and protection from exterior elements and is typically detachable from the portable device 12. The rechargeable battery 14 is recharged while attached to the portable device 10 by way of inductive charging from the base charging unit 10. As shown in FIG. 1, the portable device does not require a docking station; rather the portable device 12 only requires that the device is within a respective range of the charging unit 10 for receiving an electromagnetic field of sufficient strength for inductively recharging the rechargeable battery 14. However, due to the orientation between the transmitting inductive coils and receiving inductive coils, a docking station may be used to orient the device in a direction for optimally receiving the generated electromagnetic field, if required.

Figure 2:
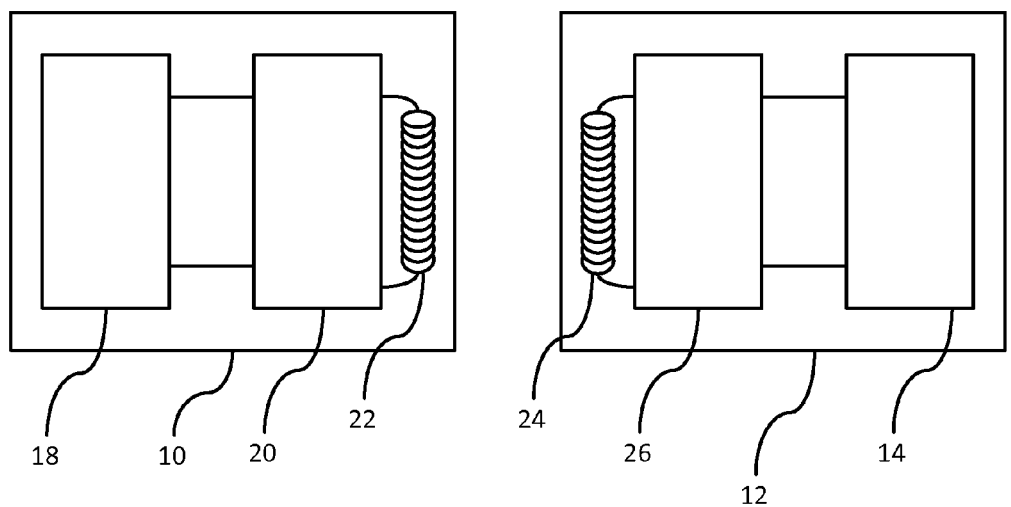
FIG. 2 is an inductive charging system for charging the portable device.

FIG. 2 is a block diagram of the inductive charging system for charging the portable device 12. The base charging unit 10 includes an exterior power source 18, a primary control circuit 20, and a primary induction coil 22. The exterior power source 18 receives energy input from an energy generating device (e.g., alternator) or an energy storage device (e.g., battery) within the vehicle. If the input energy is from an energy storage device, such as a battery, then the exterior power source may include electrical circuitry that can convert the input energy to a respective alternating current (AC). The primary control circuit 20 regulates energy generated on the primary inductive coil 22.

The portable device includes a secondary inductive coil 24, a secondary control circuit 26, and a rechargeable battery 14. The secondary inductive coil 24 and the secondary control circuit 26 may be encased within the housing 16 that protects the rechargeable battery 14 from exterior elements. The secondary control circuit 26 includes electronic circuitry for rectifying an induced AC voltage generated on the secondary inductive coil 24 for recharging the rechargeable battery 14.

The secondary control circuit 26 may include a controller or microprocessor for controlling both the amount and rate of charge provided to the rechargeable battery 14. The primary control circuit 20 applies a voltage waveform to the primary inductive coil 22 for energizing the primary inductive coil 22 at a respective voltage and frequency.

The rechargeable battery 14 of the portable device 12 during recharging will be influenced by the heat generation of the base charging unit 10. As shown in FIG. 1, the base charging unit 10 includes a powermat surface 36. The powermat surface 36 includes a surface for supporting the portable device 12. The power source and primary control circuit/coils are disposed below the surface of the powermat. The powermat surface 36 preferably includes a rubberized surface that prevents the portable device 12 from sliding around while the vehicle is in motion, and therefore, the powermat can accommodate various types of devices that have different shapes and sizes. Furthermore, the powermat surface must also not inhibit the electromagnetic field generated by the primary inductive coil from flowing to the portable device 12. It should be understood that the powermat surface is not restricted to a rubberized surface, but may include other materials suitable for maintaining the portable phone in a recharging position and allow the flow of the electromagnetic field from the primary inductive coil to the rechargeable battery of the portable device.

As described earlier, the temperature of both the portable device and the room ambient temperature influence recharging of the portable device's battery. Should the battery temperature of the portable device exceed a predetermined temperature (e.g., 47° C.), the portable device enters into a self-protection mode. In self-protection mode, the charging current is regulated according to the battery temperature. Therefore, if the self-protection mode is entered, then only a trickle charge is applied to the rechargeable battery (e.g., milli-amps). As a result, charge time for the rechargeable battery of the portable phone is significantly increased.

Figure 3:
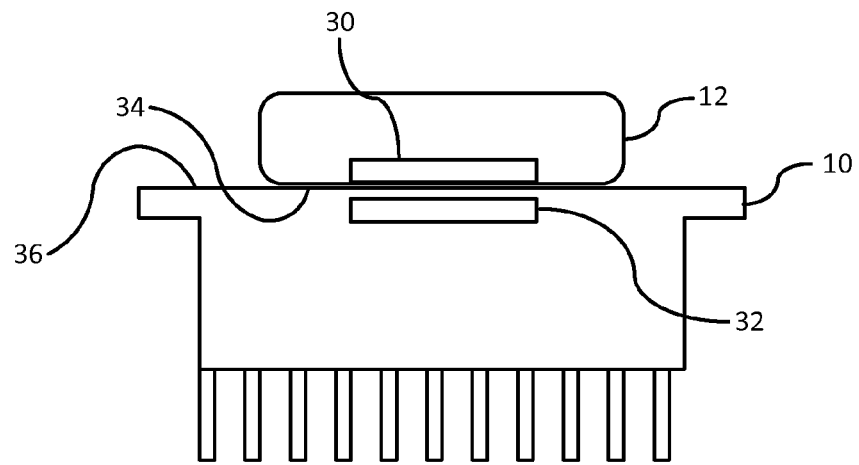
FIG. 3 is a side view of an induction charging system without a heat dissipation feature.

FIG. 3 illustrates a side view of the components of the induction charging system without a heat dissipation feature. The portable device 12 is disposed on a powermat surface 36 of the base charging unit 10. The base charging unit 10 may be integrated on various interior trim members of the vehicle that include, but are not limited to, an arm rest, center console, an accessory bin, or other dedicated surface. The secondary control circuit and coil are cooperatively shown at 30.

The base charging unit 10, which supports the portable device 12, includes the primary control circuit and coil, are cooperatively shown at 32. As illustrated in FIG. 3, an exterior surface 34 of the portable device 12 abuts the powermat surface 36 of the base charging unit 16. The contacting surface of the portable device 12 (such as in the scenario of a cellular phone) includes an elongated flat surface for which the majority of that flat surface is in contact with the flat powermat surface 36. As a result, air flow is inhibited between the powermat surface 36 and the exterior surface 34. As a result of the heat generated by the induced electromagnetic field between the portable device 12 and the base charging unit 10, and in addition to the ambient temperature of the room (particularly an automobile on a sunny and hot day), the temperature of the rechargeable battery increases significantly since heat cannot dissipate readily between the contacting surfaces.

Figure 4:
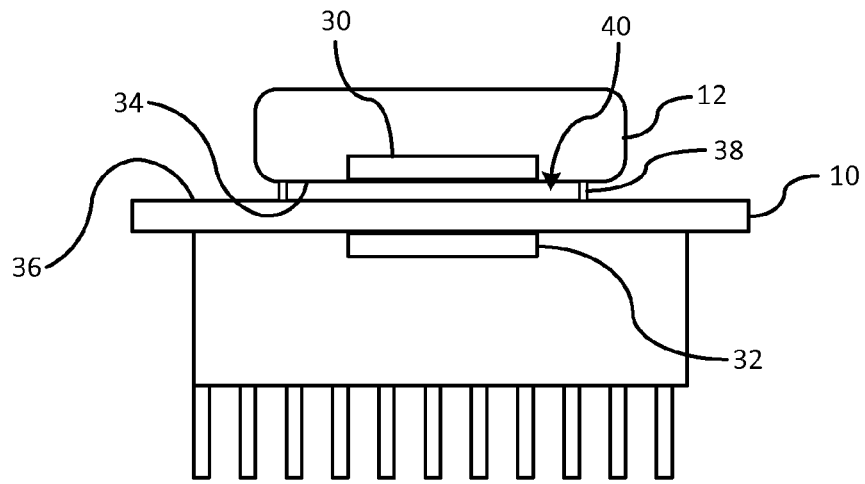
FIG. 4 is a side view of an induction charging system with a heat dissipation feature.

FIG. 4 illustrates a side view of the induction charging system with the heat dissipation feature. The portable device 12 is shown disposed on a powermat surface 36 of the base charging unit 10. The powermat includes spacers 38 for creating an air gap 40 between the surface of the powermat 36 and the surface of the portable device 12. The spacers 38 may include any shape and configuration that creates an air gap 40 between the exterior surface of the portable device 34 and the powermat surface 36 for allowing heat to dissipate therebetween. The space creating the air gap 40 between surfaces 34 and 36 may be about 2 mm. Anything larger than 2 mm may cause a reduction in the strength of induced electromagnetic field received at the rechargeable battery. Alternatively, the space may be less than 2 mm; however, as the space decreases below 2 mm, efficiency for heat dissipation decreases.

The spacers 38 may include any configuration or shape that provides a separation while allowing air flow. For example dimples, ribs, studs, posts, balls, squares, or any other shape or configuration that will support and maintain spacing between the portable device 12 and the exterior surface 36 of the powermat. In addition, the number of spacers and spacing of the spacers may be optimized for various types of equipment that will utilize the powermat for battery recharging. Factors that are used for optimization may include, but are not limited to, support of the portable device 12 on the powermat and the configuration of the spacers 38 for air flow efficiency for heat dissipation. For example, a predetermined number of studs (e.g., 4) may be used that are oriented in a square, triangular rectangular, polygon, or non-linear configuration.

Preferably, the spacers 38 are integrated with the powermat when formed; however, it is understood that the spacers may be a separately formed component that is either seated on or coupled to the exterior surface 36 of the powermat. In addition, the material composition of the spacers 38 is preferably the same as the powermat. Alternatively, the material composition of the spacers 38 may be different than the material composition of the powermat, such as a material that prevents or minimizes the thermal conduction of heat stored in the powermat to the contacting exterior surface of the portable device.

Figure 5:
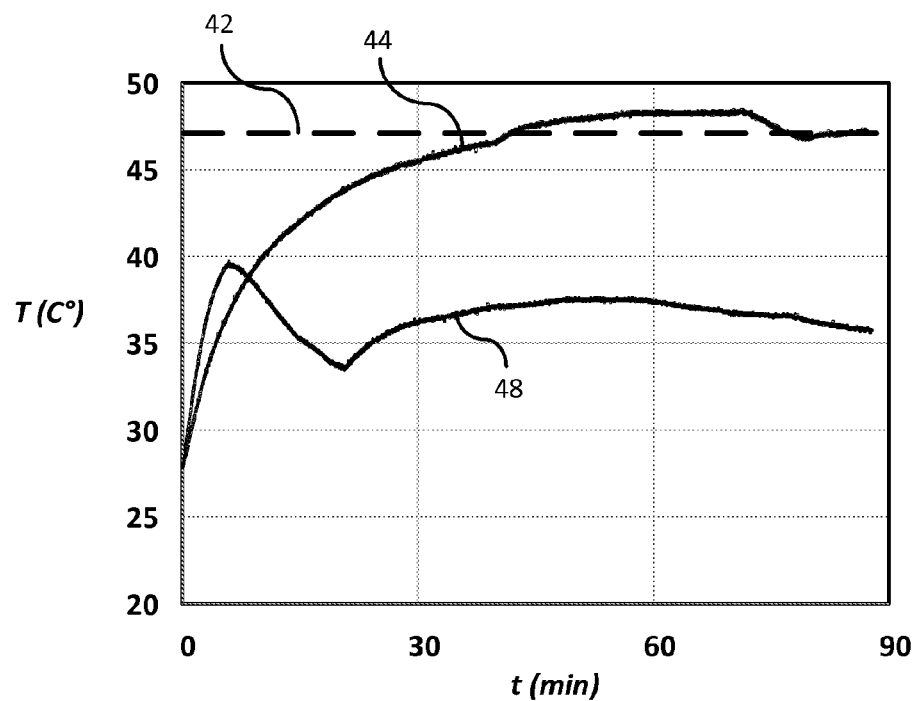
FIG. 5 is a temperature versus charging time graph.

FIG. 5 is a graph illustrating the temperature of the battery versus time during a battery recharging cycle. The chart shown herein illustrates a vehicle soaked in a hot sun for 1 hour followed by a 1.30 hours of city driving. Threshold 42 illustrates the temperature threshold (>47°) in which a portable device would enter a self-protection mode. As shown from the chart, the temperature of the rechargeable battery using the configuration without the spacers, represented by line 44, exceeds the temperature threshold at approximately 45 minutes of charging.

Figure 6:
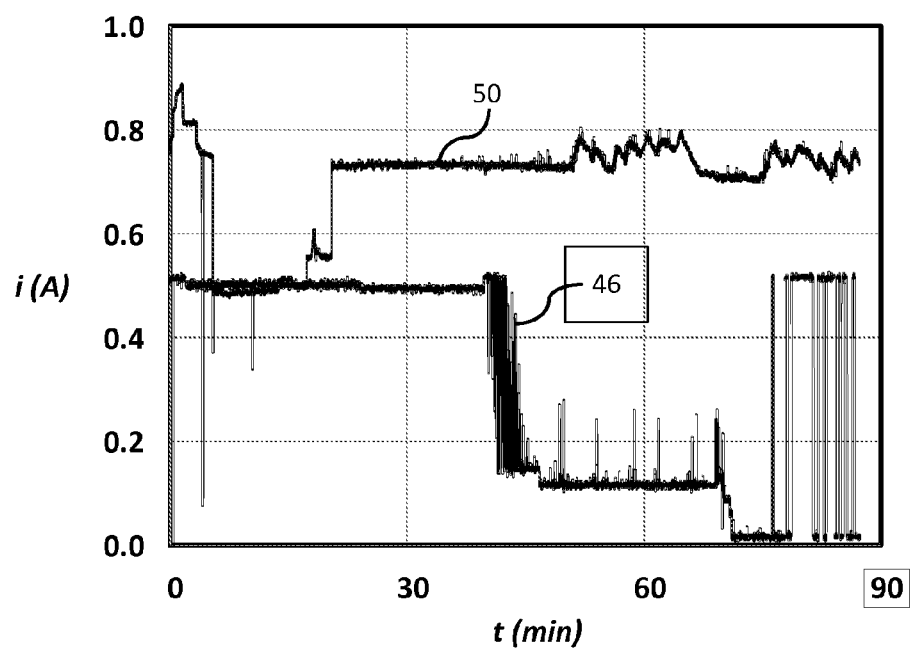
FIG. 6 is a charging current versus charging time graph.

FIG. 6 is a graph illustrating a charging current versus time. Referring to line 46 in FIG. 6, at approximately 45 minutes after charging is initiated and at the time when the predetermined temperature threshold is exceeded, the self-protection mode is enabled and the charge current decreases to a trickle charge. As a result, the state-of-charge (SOC) of the rechargeable battery during this interval increased by only 20%. It should also be noted that at approximately 80 minutes after charging is initiated, the rechargeable battery cools and the temperature of the rechargeable battery decreases below the predetermined temperature threshold. When the battery temperature drops below the predetermined temperature threshold, full charging is initiated. However, temperature of the battery readily increases due to the heat generated from the inductive charging and after the temperature of the battery exceeds the predetermined temperature threshold, self-protection mode is enabled. The cycling of the current charge repetitiously cycles on and off as illustrated by line 46 as show in FIG. 6.

Referring again to FIG. 5, the temperature of the rechargeable battery using the configuration with the spacers, as represented by line 48, never exceeds the temperature threshold.

A substantially lower steady temperature is maintained between 35° C.-40° C. FIG. 6 and particularly line 50 illustrates the charging of the rechargeable battery. As illustrated in FIG. 6, full charging is maintained throughout the charging process and is completed in 90 minutes without entering the self-protection mode. As a result, the spacers create a 2 mm air gap between the portable device and the base charging unit in order to provide cooling of the portable device through natural convection. The air gap spacing between the portable device and the powermat may be increased; however, charge current induced in the in the rechargeable battery will decrease thereby increasing the time required to fully charge the rechargeable battery. Alternatively, decreasing the air gap spacing between the portable device and the powermat may be decreased; however, the battery temperature will increase thereby increasing the chances of enabling the self-protection mode.

While certain embodiments of the present invention have been described in detail, those familiar with the art to which this invention relates will recognize various alternative designs and embodiments for practicing the invention as defined by the following claims.

What is claimed is:

1. A portable device recharging system comprising:
a base unit generating an electromagnetic field;
a portable device including a rechargeable battery inductively charged by the electromagnetic field; and
spacers disposed between the portable device and the base unit, the spacers supporting the portable device and maintaining an air gap between the base unit and the portable device.

2. The portable device recharging system of claim 1 wherein the spacers maintain a 2 mm air gap between the base unit and the portable device.

3. The portable device recharging system of claim 1 wherein the spacers maintain greater than a 0 mm and less than a 2 mm air gap between the base unit and the portable device.

4. The portable device recharging system of claim 1 wherein a shape of the spacers include studs.

5. The portable device recharging system of claim 1 wherein a shape of the spacers include posts.

6. The portable device recharging system of claim 1 wherein a shape of the spacers include balls.

7. The portable device recharging system of claim 1 wherein a shape of the spacers include squares.

8. The portable device recharging system of claim 1 wherein a shape of the spacers include dimples.

9. A portable device recharging system comprising:
a base unit generating an electromagnetic field;
a portable device including a rechargeable battery inductively charged by the electromagnetic field; and
spacers disposed between the portable device and the base unit, the spacers supporting the portable device and maintaining an air gap between the base unit and the portable device;
a powermat including a powermat surface, wherein the base unit is integrated within the powermat.

10. The portable device recharging system of claim 9 wherein the spacers are integrated as part of the powermat, wherein the spacers and the powermat include a same material composition.

11. The portable device recharging system of claim 9 wherein the spacers are separately formed from the powermat.

12. The portable device recharging system of claim 9 wherein a material composition of the spacers is selected for minimizing thermal conduction of heat stored in the powermat to a contacting exterior surface of the portable device.

13. The portable device recharging system of claim 9 wherein a configuration of the spacers on the powermat surface is selected for maximize air flow between the powermat surface and the portable device.

14. The portable device recharging system of claim 13 wherein a configuration of the spacers on the powermat surface includes a square configuration.

15. The portable device recharging system of claim 13 wherein a configuration of the spacers on the powermat surface includes a triangular configuration.

16. The portable device recharging system of claim 13 wherein a configuration of the spacers on the powermat surface includes a rectangular configuration.

17. The portable device recharging system of claim 13 wherein a configuration of the spacers on the powermat surface includes a polygon configuration.

18. The portable device recharging system of claim 13 wherein a configuration of the spacers on the powermat surface includes a non-linear configuration.

19. The portable device recharging system of claim 9 wherein a number of spacers on the powermat surface is selected to maximize air flow between the powermat surface and the portable device.

* * * * *